US012699823B2

(12) United States Patent
Yamaguchi et al.

(10) Patent No.: US 12,699,823 B2
(45) Date of Patent: Aug. 4, 2026

(54) FLOW FIELD PREDICTION DEVICE, LEARNING DEVICE, FLOW FIELD PREDICTION PROGRAM, AND LEARNING PROGRAM

(71) Applicant: KAJIMA CORPORATION, Tokyo (JP)

(72) Inventors: Junki Yamaguchi, Minato-ku (JP);
Yasuhito Yoshida, Minato-ku (JP);
Takamasa Hasama, Singapore (SG);
Sohei Arisaka, Singapore (SG);
Shimon Kasugai, Minato-ku (JP);
Yoshiaki Ito, Minato-ku (JP);
Toshihide Saka, Minato-ku (JP)

(73) Assignee: KAJIMA CORPORATION, Tokyo (JP)

( * ) Notice: Subject to any disclaimer, the term of this patent is extended or adjusted under 35 U.S.C. 154(b) by 0 days.

(21) Appl. No.: 19/111,485

(22) PCT Filed: Sep. 15, 2022

(86) PCT No.: PCT/JP2022/034587
§ 371 (c)(1),
(2) Date: Mar. 13, 2025

(87) PCT Pub. No.: WO2024/057497

PCT Pub. Date: Mar. 21, 2024

(65) Prior Publication Data

US 2025/0258983 A1 Aug. 14, 2025

(51) Int. Cl.
*G06F 30/28* (2020.01)
*G01P 5/00* (2006.01)
(Continued)

(52) U.S. Cl.
CPC .............. *G06F 30/28* (2020.01); *G06F 30/27* (2020.01); *G01P 5/001* (2013.01); *G01P 5/26* (2013.01);
(Continued)

(58) Field of Classification Search
None
See application file for complete search history.

(56) References Cited

U.S. PATENT DOCUMENTS 5,172,102 A * 12/1992 Iwamura .................. G09G 5/34
348/595
10,120,964 B2 * 11/2018 Walls ...................... G06F 30/20
(Continued)

FOREIGN PATENT DOCUMENTS

CN       120257798 A * 7/2025   ............. G06N 3/094
JP       H8184526 A    7/1996
(Continued)

OTHER PUBLICATIONS

P. Gousseau, et al; CFD simulation of near-field pollutant dispersion on a high-resolution grid: A case study by LES and RANS for a building group in downtown Montreal, Atmospheric Environment, vol. 45, Issue 2,2011,pp. 428-438, ISSN 1352-2310, https://doi.org/10.1016/j.atmosenv.2010.09.065. (Year: 2011).*
(Continued)

*Primary Examiner* — Akash Saxena
(74) *Attorney, Agent, or Firm* — Maier & Maier, PLLC

(57) ABSTRACT

A flow field prediction device includes: an analysis result acquisition unit that acquires an analysis result based on a first computation method of analyzing at least an influence between buildings with respect to a flow field in which a city block including a plurality of buildings is set as a target region; and a prediction processing unit that inputs a new analysis result acquired by the analysis result acquisition (Continued)

unit to a learning model trained using teaching data that includes an analysis result based on a second computation method that is more accurate than the first computation method, as correct answer data for input data including at least the analysis result based on the first computation method, and outputs an output from the learning model as a prediction result of the flow field.

9 Claims, 7 Drawing Sheets

(51) Int. Cl.

| | |
|---|---|
| *G01P 5/26* | (2006.01) |
| *G06F 30/13* | (2020.01) |
| *G06F 30/27* | (2020.01) |
| *G06F 113/08* | (2020.01) |
| *G06N 20/00* | (2019.01) |

(52) U.S. Cl.
    CPC .......... *G06F 30/13* (2020.01); *G06F 2113/08* (2020.01); *G06N 20/00* (2019.01)

(56) References Cited

U.S. PATENT DOCUMENTS

| | | | | |
|---|---|---|---|---|
| 11,080,438 | B2 * | 8/2021 | Gao | G06F 30/13 |
| 11,205,028 | B2 * | 12/2021 | Albert | G06N 3/084 |
| 11,714,937 | B2 * | 8/2023 | Albert | G06N 3/084 703/2 |
| 11,720,727 | B2 * | 8/2023 | Albert | G06N 3/0442 703/6 |
| 12,242,572 | B1 * | 3/2025 | Mohan | H04L 67/12 |
| 2016/0292323 | A1 * | 10/2016 | Matsuda | G06F 30/20 |
| 2019/0293836 | A1 * | 9/2019 | Nabi | G01P 5/001 |
| 2021/0124861 | A1 * | 4/2021 | Krispin | G06F 30/28 |
| 2021/0396415 | A1 * | 12/2021 | Wirth | G05B 15/02 |
| 2024/0427971 | A1 * | 12/2024 | Kim | G06F 30/28 |

FOREIGN PATENT DOCUMENTS

| | | | |
|---|---|---|---|
| JP | 2018004568 | A | 1/2018 |
| JP | 2021124368 | A | 8/2021 |
| JP | 2022124878 | A * | 8/2022 |

OTHER PUBLICATIONS

D. Xiao et al; A reduced order model for turbulent flows in the urban environment using machine learning, Building and Environment, vol. 148, 2019, pp. 323-337, ISSN 0360-1323, https://doi.org/10.1016/j.buildenv.2018.10.035. (Year: 2019).*

BenMoshe, N. et al; Using Machine Learning to Predict Wind Flow in Urban Areas. Atmosphere 2023, 14, 990. https://doi.org/10.3390/atmos14060990 (Year: 2023).*

Xiang, Songlin, et al. "Non-intrusive reduced order model of urban airflow with dynamic boundary conditions." Building and Environment 187 (2021): 107397. (Year: 2021).*

International Search Report (with English translation) and Written Opinion issued on Nov. 22, 2022, in corresponding International Application No. PCT/JP2022/034587; 7 pages.

Decision to Grant issued on Mar. 14, 2023, in corresponding Japanese Application No. 2023-504860; 6 pages.

Giacomo et al., "A multi-fidelity machine learning framework to predict wind loads on building", Journal of Wind Engineering and Industrial Aerodynamics, May 25, 2021, vol. 214, No. 104647, XP086636675, 14 pages.

Waibel et al., "Physics Meets Machine Learning: Coupling FFD with Regression Models for Wind Pressure Prediction on High-Rise Facades", SimAud 2021, Apr. 15-17, 2021, XP093396203, retrieved from the Internet: URL:https://www.researchgate.net/publication/354582811_Physics_Meets_Machine_Learning_Coupling-FFD_with_Regression_Models_for_Wind_Pressure_Prediction_on_High_Rise_Facades, 8 pages.

Extended European Search Report issued on May 21, 2026, in corresponding European Patent Application No. EP22958820.7, 8 pages.

* cited by examiner

ANALYSIS RESULT BASED ON RANS

X-AXIS COMPONENT    Y-AXIS COMPONENT    Z-AXIS COMPONENT

WIND DIRECTION DATA

BUILDING HEIGHT DATA

DISTANCE DATA FROM BUILDING

|  | Model A | Model B | RANS |
|---|---|---|---|
| EUCLIDEAN DISTANCE | 0.581 | 0.386 | 0.580 |
| hit rate | 0.863 | 0.918 | 0.899 |
| FAC2 | 0.965 | 0.982 | 0.972 |

FIG. 8

LES-Model B

LES-RANS

Around 6 m height

Around 40 m height

WIND
DIRECTION 0.6
0.5
0.4
0.3
0.2
0.1
0.0

FLOW FIELD PREDICTION DEVICE, LEARNING DEVICE, FLOW FIELD PREDICTION PROGRAM, AND LEARNING PROGRAM

TECHNICAL FIELD

The present invention relates to a device and a program for predicting a flow field around a building.

BACKGROUND

Conventionally, in order to investigate changes in wind environment, such as a possibility for a building wind to occur in the surrounding area during construction of a large-scale structure such as a high-rise building, a wind environment around the structure is analyzed by a wind tunnel experiment and a CFD (Computational Fluid Dynamics), and a design proposal is created not to deteriorate the wind environment.

The wind environment is evaluated by, for example, wind speed distributions. It is known that the wind speed distributions formed around a building is affected not only by the shape of the building and the wind direction but also by obstacles such as buildings near the building. For this reason, there is a demand for an analysis method for a wide region including plural buildings. For example, Patent Document 1: Japanese Unexamined Patent Application, Publication No. 2021-124368 proposes a method of using a neural network to predict wind speed distributions for an urban area including plural buildings.

SUMMARY

However, according to the conventional method, it is difficult to accurately predict wind speed distributions for a region including plural buildings (hereinafter, referred to as a city block), and the analysis based on the CFD takes a long time. On the other hand, simple analysis methods or prediction methods using a neural network have not achieved sufficient accuracy.

The present invention is to provide a flow field prediction device, a learning device, a flow field prediction program, and a learning program capable of predicting a flow field of a city block with high accuracy and efficiency.

A flow field prediction device according to the present invention includes: an analysis result acquisition unit that acquires an analysis result based on a first computation method of analyzing at least an influence between buildings with respect to a flow field in which a city block including a plurality of buildings is set as a target region; and a prediction processing unit that inputs a new analysis result acquired by the analysis result acquisition unit to a learning model trained using teaching data that includes an analysis result based on a second computation method that is more accurate than the first computation method, as correct answer data for input data including at least the analysis result based on the first computation method, and outputs an output from the learning model as a prediction result of the flow field.

The analysis result acquisition unit may acquire, as the analysis result, a plurality of pieces of plane data including plane data made up of information on a flow field at a predetermined height in the city block, and the learning model may output at least a prediction result of the predetermined height in response to the input of the analysis result.

The analysis result acquisition unit may acquire, as the analysis result, the plurality of pieces of plane data of successive heights within a predetermined range, and the learning model may output a plurality of prediction results of successive heights in the same range as the input in response to the input of the analysis result.

The analysis result acquisition unit may acquire, as the analysis result, the plurality of pieces of plane data of successive heights within a predetermined range, and the learning model sequentially may add, to the input, outputs successive in a height direction obtained by input of the plane data, and may thereby output a plurality of prediction results of successive heights.

The analysis result acquisition unit may acquire, as the analysis result, a plurality of pieces of plane data of successive points in time, and the learning model may sequentially add, to the input, outputs successive in a time direction obtained by input of the plane data, and may thereby output a plurality of prediction results of successive points in time.

The analysis result based on the first computation method may include information on at least one of wind separation, wake, or contraction.

The first computation method may be RANS (Reynolds-Averaged Navier-Stokes Simulation), and the second computation method may be LES (Large Eddy Simulation).

The learning model may be configured by a CNN (Convolutional Neural Network).

A learning device according to the present invention includes: a first data acquisition unit that acquires a first analysis result based on a first computation method of analyzing at least an influence between buildings with respect to a flow field in which a city block including a plurality of buildings is set as a target region; a second data acquisition unit that acquires, with respect to the flow field in which the target region is the city block, a second analysis result based on a second computation method that is more accurate than the first computation method; and a learning processing unit that updates a learning model using teaching data that includes the second analysis result as correct answer data for input data including the first analysis result.

A flow field prediction program according to the present invention causes a computer to function as the flow field prediction device.

A learning program according to the present invention causes a computer to function as the learning device.

Effects of the Invention

According to the present invention, it is possible to predict a flow field of a city block with high accuracy and efficiency.

BRIEF DESCRIPTION OF THE DRAWINGS

FIG. 8 is a diagram showing distributions of a Euclidean distance in LES-model B and LES-RANS.

DETAILED DESCRIPTION OF EMBODIMENTS

In the present embodiment, a machine learning model such as a CNN (Convolutional Neural Network) is used, and a trained model capable of predicting a flow field with high accuracy in a city block is provided by supervised learning where flow field data such as wind speed or wind pressure is given as correct answer data corresponding to input data. The wind speed, the wind pressure or the like is assumed as the flow field, but a case of predicting an average wind speed distribution will be described as an example in the following embodiments.

The input data for the learning model includes information analyzed about the influence between buildings that should be taken into account by targeting city blocks, instead of or in addition to conventional building information such as a section height and wind direction information. Specifically, information on a complex flow field including information on at least one of wind separation, wake, and contraction in surrounding buildings is used as an input.

In the present embodiment, a relatively simple method (first computation method) capable of high-speed computation is used to acquire the information on the complex flow field, and supervised learning of the learning model is performed using the analysis result based on a computation method (second computation method) with higher accuracy as correct answer data.

Examples of the first computation method to be applicable include RANS (Reynolds-Averaged Navier-Stokes Simulation), vorticity method, and Newton's method. Examples of the second computation method to be applicable include LES (Large Eddy Simulation), DNS (Direct Numerical Simulation), experimental PIV (Particle Image Velocimetry), and Lattice Boltzmann method.

Hereinafter, first to fourth embodiments having different modes of input to the learning model will be described as examples. It is assumed that the first computation method is RANS and the second computation method is LES.

First Embodiment

In a first embodiment, inputs to the learning model are three pieces of image data representing wind speed distributions in three directions of an x-axis, a y-axis, and a z-axis at a certain height in the city block computed by RANS, respectively, and image data that is added as appropriate to improve prediction accuracy.

Figure 1:
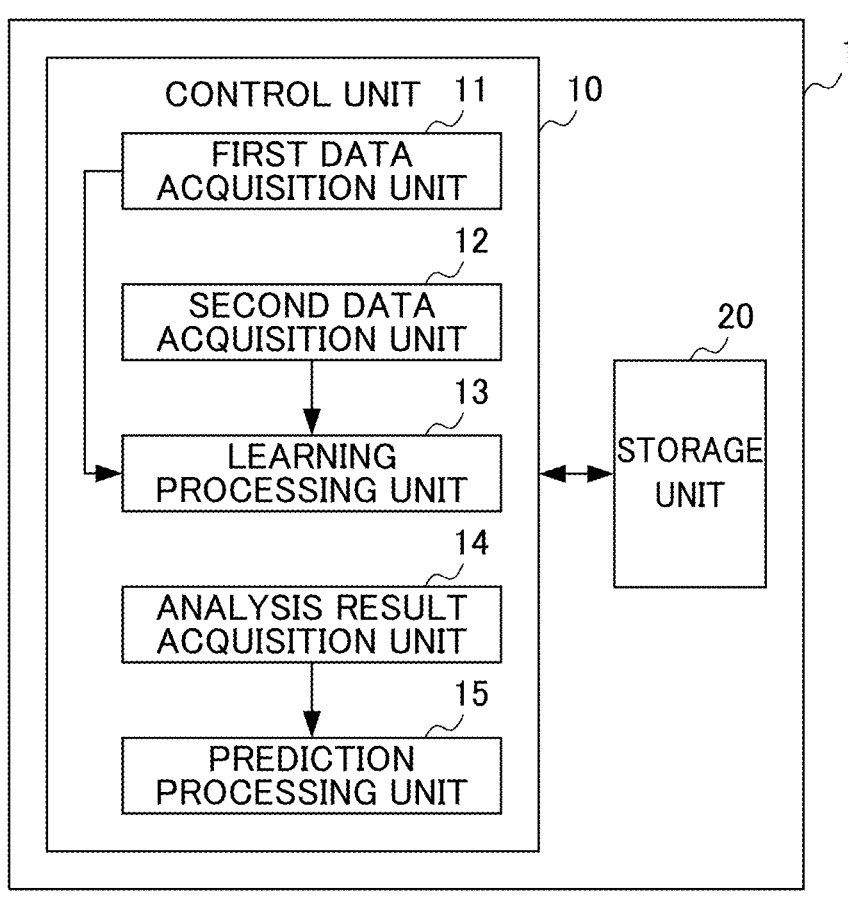
FIG. 1 is a block diagram showing a functional configuration of a flow field prediction device according to a first embodiment.

FIG. 1 is a block diagram showing a functional configuration of a flow field prediction device 1 according to the present embodiment. The flow field prediction device 1 also has a function as a learning device, and executes a learning phase of a learning model and a prediction phase using a trained model. The function as the learning device may be provided in another information processing device. In this case, the flow field prediction device 1 is provided with parameters of a learning model that has been trained using a sufficient number of pieces of teaching data.

The flow field prediction device 1 is an information processing device (computer) including an input/output and a communication interface in addition to a control unit 10 and a storage unit 20. The control unit 10 is used to control the flow field prediction device 1 as a whole, and reads out and executes various types of software including flow field prediction programs stored in the storage unit 20 as appropriate, thereby implementing each function in the present embodiment. The control unit 10 may be a CPU.

The storage unit 20 is a storage region for various programs and various pieces of data for causing a hardware group to function as the flow field prediction device 1, and may be a ROM, a RAM, a flash memory, or a hard disk drive (HDD), for example. Specifically, the storage unit 20 stores not only various types of software such as flow field prediction programs but also various parameters for constructing a learning model, teaching data and the like.

The control unit 10 includes a first data acquisition unit 11, a second data acquisition unit 12, and a learning processing unit 13 which are responsible for the learning phase, and an analysis result acquisition unit 14 and a prediction processing unit 15 which are responsible for the prediction phase.

The first data acquisition unit 11 acquires a first analysis result based on a first computation method (for example, RANS) that analyzes at least the influence between buildings with respect to a flow field in which a city block is set as a target region. At this time, the first data acquisition unit 11 may acquire, as analysis results, a plurality of pieces of adjacent plane data in addition to plane data including information on a flow field (XY section information) at a predetermined height in the city block. For example, the first data acquisition unit 11 may acquire not only one piece of XY section information at a certain height but also either one or both of upper and lower sides of a width of a computational mesh (for example, a predetermined width of several tens of centimeters to several meters) one by one or several.

The second data acquisition unit 12 acquires a second analysis result based on a second computation method (for example, LES) that is more accurate than the first computation method with respect to the same flow field as the first data acquisition unit 11. The second analysis result correspond to the first analysis result obtained by the first data acquisition unit 11, and is a more accurate analysis result indicating the information on the flow field at the same height in the same city block.

The learning processing unit 13 updates the learning model with teaching data that includes the second analysis result as correct answer data for the input data including the first analysis result. The learning model in the present embodiment uses, for example, U-Net++, which is a type of CNN, but is not limited thereto, and various machine learning models may be employed.

The analysis result acquisition unit 14 acquires an analysis result based on the first computation method for the flow field of the city block as a target for prediction, and provides it to the prediction processing unit 15 as an input to the learning model. At this time, the analysis result acquisition unit 14 acquires the analysis result in the same format as the first data acquisition unit 11.

The prediction processing unit 15 inputs a new analysis result acquired by the analysis result acquisition unit 14 to the learning model trained by the learning processing unit 13, and outputs an output of the learning model as a result of flow field prediction. At this time, the learning model outputs at least the prediction result of a predetermined height in response to the input of the analysis result of the predetermined in the city block as a target for prediction and the adjacent height.

Here, in the learning phase and the prediction phase, the input date to the learning model may be only the analysis result based on the RANS, which is the first computation method, but the following various pieces of data may be added.

Figure 2:
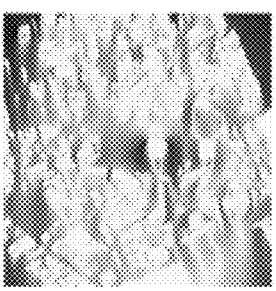
FIG. 2 is a diagram illustrating image data input to a learning model in the first embodiment.
Figure 2:
Figure 2:
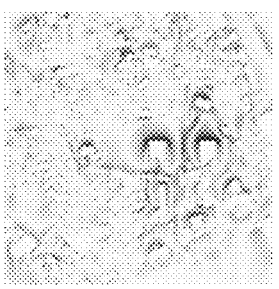
Figure 2:
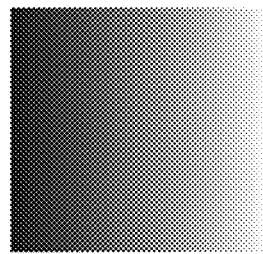
Figure 2:
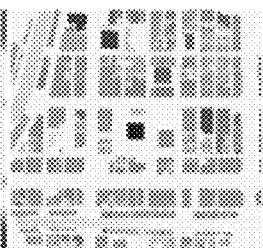
Figure 2:
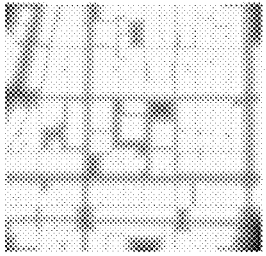

FIG. 2 is a diagram illustrating image data input to the learning model in the present embodiment. First, the analysis result based on the RANS is provided as three pieces of image data representing wind speed distributions in three axial directions with respect to a certain height, and a pixel value indicates an average wind speed of each cell.

Wind direction data indicates a wind direction input to the city block, and is, for example, image data represented by gradation from a windward side to a leeward side. Building height data indicates positions and heights of buildings existing in the city block, and is image data in which the height of each position (cell) is represented by pixel values, for example. Distance data from the building indicates a distance from each position (cell) in the city block to the nearest building, and is image data in which the distance is represented by pixel values, for example.

Since the volume of information processed by the learning model increases with these additional data, it is expected that the accuracy of compensating the analysis result based on the RANS to the analysis result based on the LES, that is, the prediction accuracy of the flow field can be improved.

Figure 3:
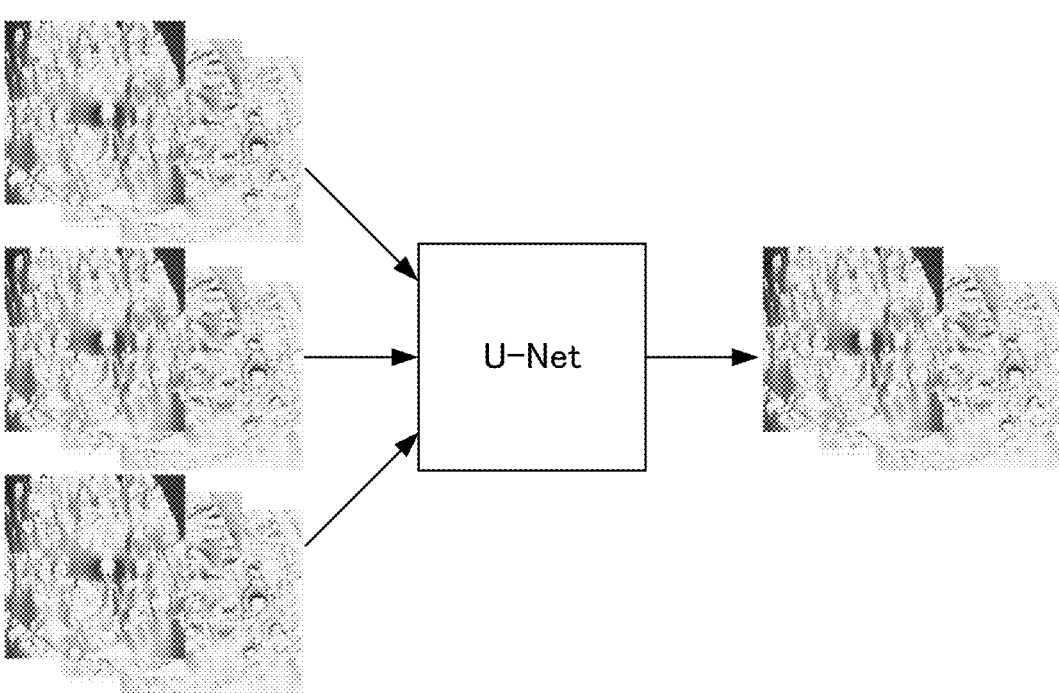
FIG. 3 is a diagram illustrating a relationship between input data and output data in the learning model of the first embodiment.

FIG. 3 is a diagram illustrating a relationship between the input data and the output data in the learning model of the present embodiment. In this case, six images, which are the analysis result of adjacent heights above and below based on the RANS, are added to the input data regarding the height as a target for prediction. In contrast to the input data, the output data are at least three images corresponding to the analysis result based on the LES.

In this way, when the information on the adjacent heights above and below is added to the input data regarding the height as a target for prediction, it is expected that the accuracy of compensating the analysis result based on the RANS to the analysis result based on the LES, that is, the prediction accuracy of the flow field can be improved.

Second Embodiment

In a second embodiment, the functional configuration of the flow field prediction device 1 is similar to that of the first embodiment except the input/output of the learning model.

The first data acquisition unit 11 and the analysis result acquisition unit 14 acquire, as analysis results, a plurality of pieces of plane data of successive heights within a predetermined range. Specifically, the inputs to the learning model are three pieces of image data representing wind speed distributions in the three directions of the x-axis, the y-axis, and the z-axis at the successive heights in the predetermined range in the city block computed by RANS, respectively, and image data that is added as appropriate to improve prediction accuracy. In other words, three sets of a plurality of successive images are prepared for each axis according to the height range.

Then, the learning model outputs a plurality of prediction results of successive heights in the same range as the input in response to the input of the analysis result. In other words, the analysis results acquired by the second data acquisition unit 12 are also a plurality of pieces of plane data of successive heights in the same range as in the first data acquisition unit 11.

Figure 4:
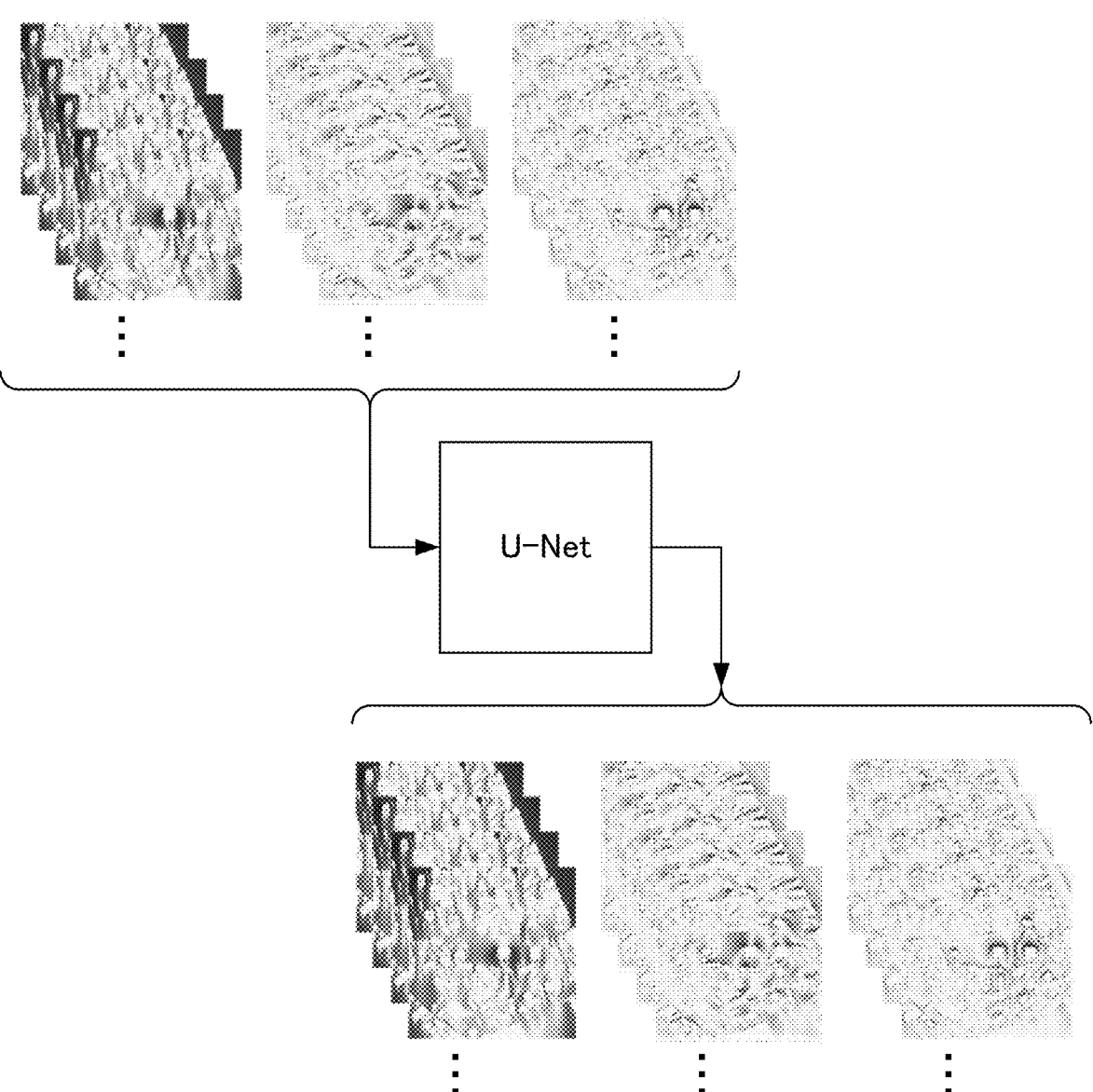
FIG. 4 is a diagram illustrating a relationship between input data and output data in a learning model of a second embodiment.

FIG. 4 is a diagram illustrating a relationship between the input data and the output data in the learning model of the present embodiment. Here, three sets of, for example, 32 image groups representing analysis results successive in a height direction based on the RANS are input. Similarly to the input data, the output data is also three sets of 32 image groups representing the prediction results.

In this way, for a three-dimensional wind environment in the city block region by using the learning model in which the three-dimensional analysis result added with the height direction is input and output, it is expected that the accuracy of compensating the analysis result based on the RANS to the analysis result based on the LES, that is, the prediction accuracy of the flow field can be improved.

Third Embodiment

In a third embodiment, the functional configuration of the flow field prediction device 1 is the same as in the first and second embodiments, but the configuration and the input/output of the learning model are different.

The first data acquisition unit 11 and the analysis result acquisition unit 14 acquire, as analysis results for inputting to the learning model, a plurality of pieces of plane data of successive heights within a predetermined range. To the learning model, image data representing wind speed distributions at the successive heights in a predetermined range in the city block computed by RANS are sequentially input, and additionally the outputs obtained in response to the previous input are sequentially added to the input. Thus, a plurality of prediction results successive in a height direction are sequentially output. As in the first and second embodiments, additional information may be input as appropriate to improve prediction accuracy.

Figures 5, 6:
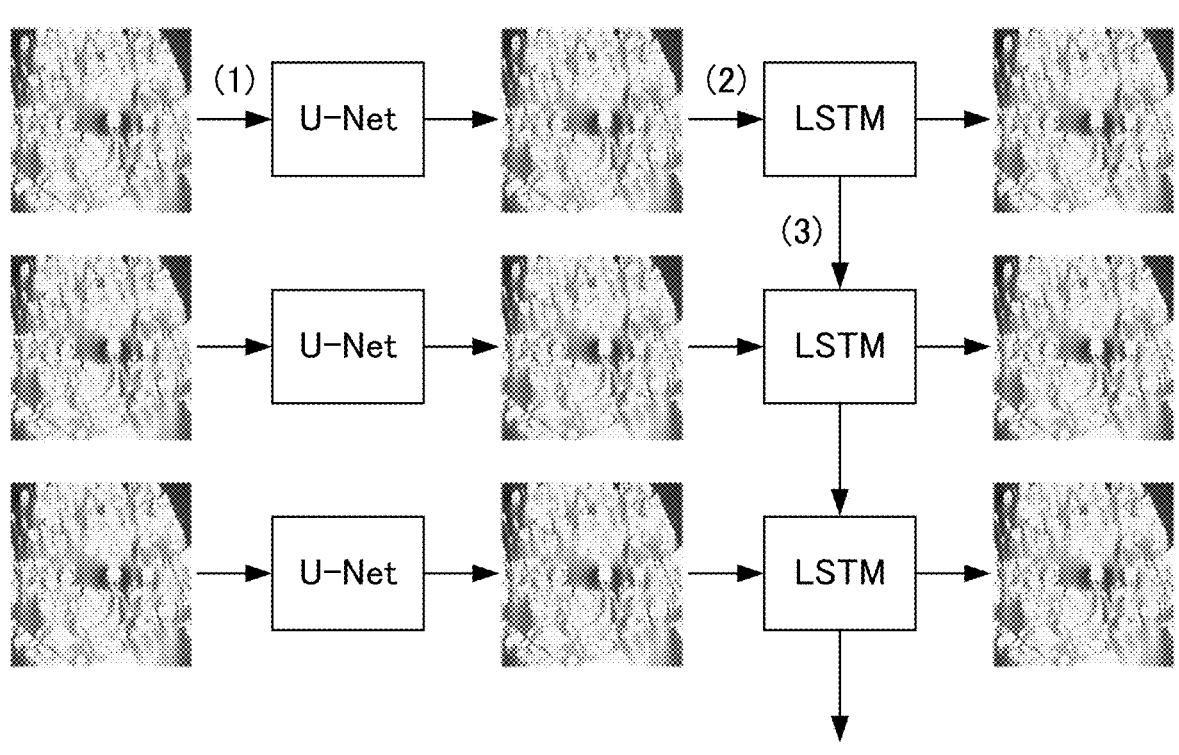
FIG. 5 is a diagram illustrating a relationship between input data and output data in a learning model of a third embodiment.
FIG. 6 is a table showing an average value of an accuracy index of each model in entire test data.

FIG. 5 is a diagram illustrating a relationship between the input data and the output data in the learning model of the present embodiment. Here, as an example of the learning model, LSTM (Long Short Term Memory), which is a type of recurrent neural network for handling time-series data, is used in combination with U-Net.

For example, the analysis results based on the RANS are sequentially input to the U-Net from a high layer to a low layer (1), the output is input to the LSTM (2), and the output is further input to an adjacent lower LSTM (3).

In this way, when the prediction results at the time of sequentially predicting the flow fields at the successive heights are sequentially added to the next input, it is expected for a three-dimensional wind environment in the city block region that the accuracy of compensating the analysis result based on the RANS to the analysis result based on the LES, that is, the prediction accuracy of the flow field can be improved.

Fourth Embodiment

In a fourth embodiment, the functional configuration of the flow field prediction device 1 is similar to that of the third embodiment except the input/output of the learning model.

The first data acquisition unit 11 and the analysis result acquisition unit 14 acquire, as analysis results for inputting to the learning model, a plurality of pieces of plane data successive in a time direction in the city block. Similarly to the third embodiment, the learning model sequentially processes a plurality of analysis results, but data successive in a time direction rather than the data successive in the height direction in the third embodiment is input in time series at this time. Thus, a plurality of prediction results at successive points in time are output.

In other words, in FIG. 5, for example, the results analyzed by the RANS are sequentially input to the U-Net in the order of time transition (1), the outputs are input to the LSTM (2), and the outputs are further input to the LSTM corresponding to the subsequent time (3).

In this way, when the prediction results at the time of sequentially predicting the flow fields at the successive points in time are sequentially added to the next input, it is expected for changes in wind environment in the city block region that the accuracy of compensating the analysis result based on the RANS to the analysis result based on the LES, that is, the prediction accuracy of the flow field can be improved.

Experimental Result

The result of the prediction accuracy of the flow field according to the above-described embodiments is shown compared with a case of not using the analysis result based on the RANS, which is the first computation method. Here, the prediction results according to the first embodiment are exemplified using the section shape, the wind direction, the building height, the distance from the building, and the information on the adjacent XY section (horizontal plane) as the input to the learning model, in addition to the analysis result based on the RANS.

In contrast to a model A that does not use the analysis result based on RANS, a model B is set as the case of the first embodiment in which the three components of the average wind speed computed by the RANS are further input. In either case, the correct answer data in the learning phase are the three components of the average wind speed computed by the LES.

Specifically, for data used in machine learning, computation results for a $1/400$-scale model that reproduces a wind tunnel experiment were prepared by RANS and LES for plural types of city blocks. The computational mesh is about 50 million elements common for the RANS and LES. In addition, wind angles were computed for 16 azimuths rotated from 0° to 360° by 22.5°. The data representing the analysis results based on the RANS and LES were created by linear interpolation into a region of the same dimensions having 769×769×399 cells in the X, Y, and Z directions from the city block region. Each of the divided cells has time-averaged wind speeds in the X, Y, and Z directions as components. Further, the data representing the building shape is three-dimensional data of 769×769×399 having the occupancy rate of the building in each of the cells as an element. During learning, these pieces of data were sliced on the XY plane (horizontal plane), and was used two-dimensional data in which a central part of the city block was further trimmed to 512×512.

For the prediction accuracy, the analysis result based on the LES is regarded as the correct answer, and the degree of discrepancy from the analysis result is evaluated.

Specifically, in addition to the Euclidean distance of the wind speed vector, the hit rate and FAC2 shown in Document A below were used. The hit rate and FAC2 were calculated comparing scalar values of the wind speed vector for each cell with respect to the data in one wind direction, using the computation result based on the LES as a true value. Document A: Okaze et al.: Large-eddy simulation of flow around an isolated building: A step-by-step analysis of influencing factors on turbulent statistics, Building and Environment, 2021.

Figure 7:
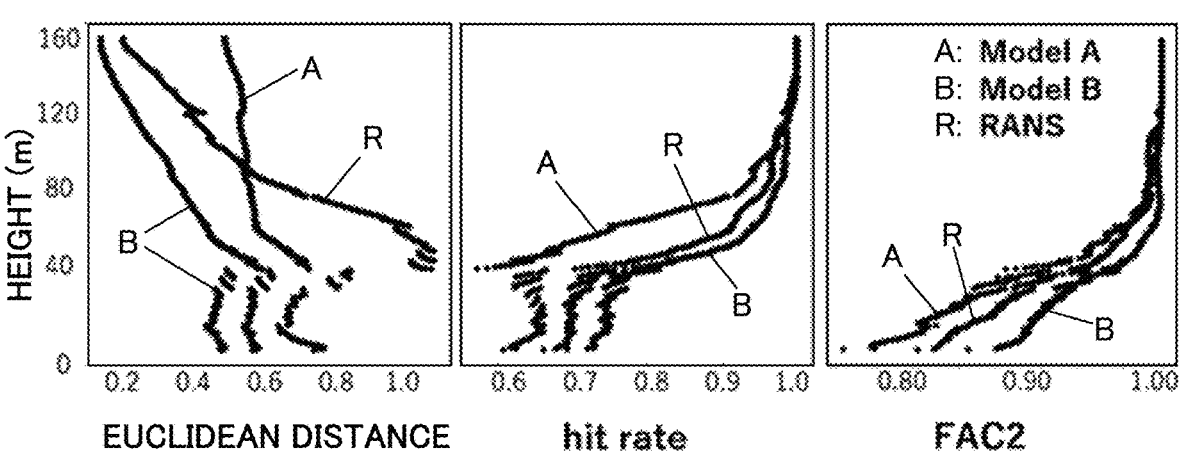
FIG. 7 is a graph showing an average value of an accuracy index for each height in a city block.

FIG. 6 is a table showing an average value of an accuracy index of each model in the entire test data. It can be considered that the smaller the Euclidean distance and the closer the hit rate and FAC2 values are to 1, the better the computation result based on the LES can be reproduced. FIG. 7 is a graph showing an average value of an accuracy index for each height in the city block.

In model A, according to indices in FIG. 6, it is considered to be able to make overall predictions that are as close to those in the LES as those in the RANS. However, form comparison between model A and the RANS in the graph of FIG. 7, model A has more problems with the prediction accuracy in middle and lower layers compared with the RANS, and cannot sufficiently cope with the complexity of the flow field in the city block of the middle and lower layers.

On the other hand, for model B, the Euclidean distance is improved by about 33% compared with the RANS as shown in FIG. 6. Furthermore, from comparison between model B and the RANS in the graph of FIG. 7, model B shows better results at any height and in any index compared with the RANS.

Figure 8:
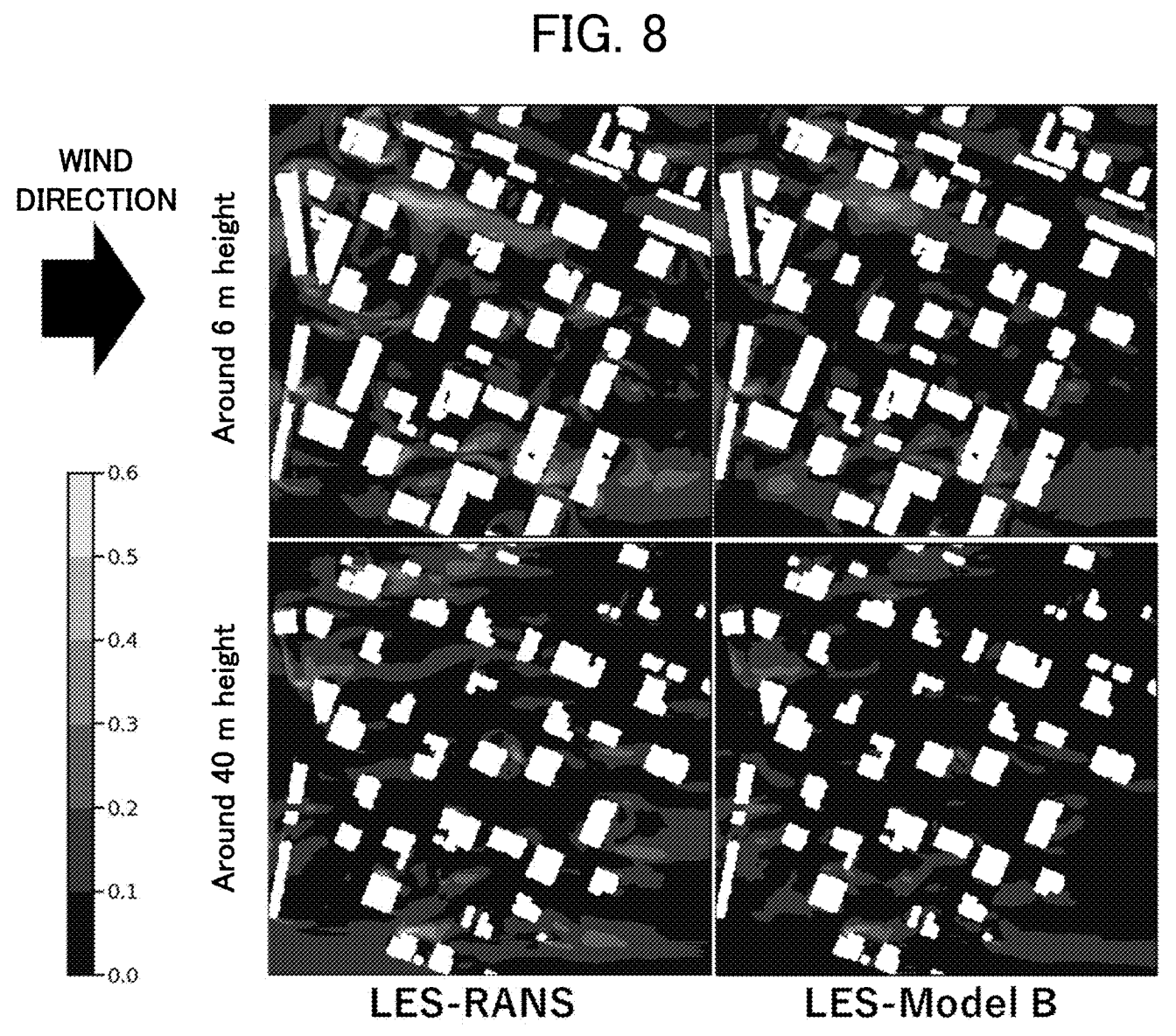

FIG. 8 is a diagram showing distributions of a Euclidean distance in LES-model B and LES-RANS. Here, experimental results at a height of around 6 m and a height of around 40 m are shown. It can be seen that an error around corners of buildings where the distance is large in the distribution around 6 m height in the LES-RANS is compensated in the distribution in LES-model B. In addition, from comparison between the distributions around 40 m height, it can be seen in model B that errors in separation and wake areas caused by the buildings are improved and the prediction accuracy of the flow field not good in the RANS is improved.

As described above, according to the above-described embodiments, the flow field prediction device 1 uses the analysis result obtained by the first computation method (for example, RANS) as input data to predict the flow field in the city block with the supervised learning using the second computation method (for example, LES) with more accuracy as correct answer data. Thus, the flow field prediction device 1 can compensate the analysis result based on the first computation method with a relatively small processing load to accuracy equivalent to the analysis result based on the second computation method with more accuracy. Therefore, the flow field prediction device 1 can predict a complex flow field in the city block including a plurality of buildings with high accuracy and efficiency.

The embodiments of the present invention have been described above, but the present invention is not limited to the above-described embodiments. Moreover, the effects described in the above-described embodiments are merely enumerations of the most suitable effects produced by the present invention, and the effects of the present invention are not limited to those described in the embodiments.

For example, in the above-described embodiments, the analysis target is the three-dimensional wind speed vector, but may be a two-dimensional vector or a scalar value without being limited thereto. Further, the analysis target may be a wind pressure instead of or in addition to the wind speed.

A flow field prediction method by the flow field prediction device 1 is implemented by software. When the method is implemented by software, a program constituting the software is installed in an information processing device (computer). Further, such a program may be recorded on a removable medium such as a CD-ROM and distributed to users, or may be distributed by being downloaded to a user's computer via a network. Furthermore, such a program may be provided to the user's computer as a web service via a network without being downloaded.

The invention claimed is:

1. A flow field prediction device comprising:

a memory; and a processor, wherein the processor is configured to:

provide a machine learning model, by:

receiving a plurality of instances of input data, each instance of input data relating to buildings in a city block including a plurality of buildings;

analyzing each instance of input data according to a low-accuracy computation method, obtaining a low-accuracy analysis result, and setting the low-accuracy analysis result as a first element in paired training data;

analyzing each instance of input data according to a high-accuracy computation method, obtaining a high-accuracy analysis result, and setting the high-accuracy analysis result as a second element in the paired training data; and training the machine learning model using the paired training data, wherein each low-accuracy analysis result is used as initial data and the high-accuracy analysis result is used as correct answer data;

receive a new input of a new city block including a new plurality of buildings that is set as a target region;

perform the low-accuracy computation method on the new input in order to provide a new low-accuracy analysis result; and use the machine learning model to apply an adjustment to the new low-accuracy analysis result in order to provide a final prediction, wherein providing the final prediction is performed without performing the high-accuracy computation method on the new input.

2. The flow field prediction device according to claim 1, wherein the processor is further configured to:

acquire, as the new low-accuracy analysis result, a plurality of pieces of plane data including plane data made up of information on a flow field at a predetermined height in the city block, and with the machine learning model, output at least a prediction result of the predetermined height in response to the input of the new low-accuracy analysis result.

3. The flow field prediction device according to claim 2, wherein the processor is further configured to:

acquire, as the new low-accuracy analysis result, the plurality of pieces of plane data of successive heights within a predetermined range, and with the machine learning model, output a plurality of prediction results of successive heights in the same range as the input in response to the input of the new low-accuracy analysis result.

4. The flow field prediction device according to claim 2, wherein the processor is further configured to:

acquire, as the new low-accuracy analysis result, the plurality of pieces of plane data of successive heights within a predetermined range, and with the machine learning model, sequentially add, to the input, outputs successive in a height direction obtained by input of the plane data, and thereby output a plurality of prediction results of successive heights.

5. The flow field prediction device according to claim 2, wherein the processor is further configured to:

acquire, as the new low-accuracy analysis result, a plurality of pieces of plane data of successive points in time, and with the learning model, sequentially add, to the input, outputs successive in a time direction obtained by input of the plane data, and thereby output a plurality of prediction results of successive points in time.

6. The flow field prediction device according to claim 1, wherein the new low-accuracy analysis result based on the first computation method includes information on at least one of wind separation, wake, or contraction.

7. The flow field prediction device according to claim 1, wherein the low-accuracy computation method is Reynolds-Averaged Navier-Stokes Simulation (RANS), and the high-accuracy computation method is Large Eddy Simulation (LES).

8. The flow field prediction device according to claim 1, wherein the machine learning model is configured by a Convolutional Neural Network (CNN).

9. A non-transitory computer-readable medium storing a flow field prediction program for causing a computer to function as the flow field prediction device according to claim 1.

\* \* \* \* \*